(12) United States Patent
Symons

(10) Patent No.: US 6,248,822 B1
(45) Date of Patent: Jun. 19, 2001

(54) COMPOSITE PRODUCT

(75) Inventor: Michael Windsor Symons, Pretoria (ZA)

(73) Assignee: Windsor Technologies Limited, Nassau (BS)

( * ) Notice: Subject to any disclaimer, the term of this patent is extended or adjusted under 35 U.S.C. 154(b) by 0 days.

(21) Appl. No.: 09/214,412

(22) PCT Filed: Jun. 26, 1997

(86) PCT No.: PCT/GB97/01750

§ 371 Date: Dec. 28, 1998

§ 102(e) Date: Dec. 28, 1998

(87) PCT Pub. No.: WO97/49532

PCT Pub. Date: Dec. 31, 1997

(30) Foreign Application Priority Data

Jun. 27, 1996 (ZA) .................................................... 96/5466

(51) Int. Cl.$^7$ ...................................................... C08L 3/34
(52) U.S. Cl. ...................... 524/450; 524/446; 524/449; 523/206
(58) Field of Search ................................... 524/449, 446, 524/450; 523/206, 208, 209; 428/35.7, 71, 159, 160, 312.2, 295.1, 296.1, 296.4, 297.1, 368, 403, 425.5, 501, 502, 524

(56) References Cited

U.S. PATENT DOCUMENTS

| 2,135,554 | * | 11/1938 | Babor | ........................................ 18/48 |
|---|---|---|---|---|
| 4,485,203 | * | 11/1984 | Hutchinson | ........................... 524/414 |
| 5,145,627 | * | 9/1992 | Berion et al. | ......................... 264/113 |
| 5,174,818 | * | 12/1992 | Symons | .................................. 106/686 |
| 5,552,469 | * | 9/1996 | Beall et al. | ........................... 524/445 |
| 5,879,600 | * | 3/1999 | Symons | ................................ 264/110 |

FOREIGN PATENT DOCUMENTS

| 564 137 | 7/1975 | (CH) | ................................ E04C/2/02 |
|---|---|---|---|
| 921 051 | 12/1954 | (DE) . | |
| WO 96/13468 | 5/1996 | (WO) | ............................ C04B/14/20 |

* cited by examiner

Primary Examiner—Edward J. Cain
Assistant Examiner—Kat Lee Wyrozebski
(74) Attorney, Agent, or Firm—Pillsbury Winthrop LLP

(57) ABSTRACT

A method of making a composite product includes the steps of impregnating particles of an exfoliated vermiculite or a lignocellulosic material with an impregnating composition comprising a first thermosetting resin, an extending liquid for the thermosetting resin, if necessary a catalyst for the thermosetting resin and a coloring agent for the particles; removing the extending liquid; subjecting the impregnated particles to suitable conditions, generally of temperature and for pressure, to polymerize or cross-link the first thermosetting resin; coating the particles so produced with a binder composition comprising a second thermosetting resin and if necessary a catalyst for the second thermosetting resin; forming the particles into a desired shape, either in a mould or on a plate of a press; and subjecting the particles to suitable conditions to polymerize, condense or cross-link the second thermosetting resin to bind the particles together to form the composite product.

16 Claims, No Drawings

COMPOSITE PRODUCT

BACKGROUND OF THE INVENTION

This invention relates to a method of making a composite product from particles of an exfoliated vermiculite impregnated with a suitable impregnating composition containing a thermosetting resin, and to the composite product so produced.

Examples of decorative resinous composites in common use include "cultured" marble made from filled and pigmented polyester resin systems where colour blending is incomplete and which are cast using, vibration.

Granitic composites are made by dyeing or pre-pigmenting a polyester resin system, polymerising the resin, milling it to acceptable particle size and then using this to fill a liquid unsaturated polyester resin system which is either clear or which has been dyed, and in which the pre-coloured set polyester resin particles do not either float or drop out during the subsequent casting or spraying of the product.

A further composite is produced when pre-pigmented resin systems are applied through a multi-head gun onto substrates in such a way that a variegated finish results, due to the incomplete mixing or blending of the different colour streams on the surface.

All three composites described above are characterised by high cost because the resin proportion of the final composite generally exceeds 80% by weight. Another disadvantage of most composites is that a slurry or a paste or a composition containing hard particles such as stone or marble chip cannot be press formed. In addition, resinous compositions heavily filled with inorganic extenders such as calcium carbonate cannot be easily cut or worked after casting and may often be dimensionally unstable.

SUMMARY OF THE INVENTION

According to a first aspect of the invention there is provided a method of making a composite product which method includes the steps of:

(1) impregnating particles of an exfoliated vermiculite with an impregnating composition comprising a first thermosetting resin, an extending liquid for the first thermosetting resin, if necessary a catalyst for the first thermosetting resin, and a colouring agent for the particles;

(2) removing the extending liquid;

(3) subjecting the impregnated particles to suitable conditions to polymerise or cross-link the first thermosetting resin;

(4) coating the particles of step (3) with a binder composition comprising a second thermosetting resin and if necessary a catalyst for the second thermosetting resin;

(5) forming the particles of step (4) into a desired shape; and (6) subjecting the particles of step (5) to suitable conditions to polymerise or cross-link the second thermosetting resin to bind the particles together to form the composite product.

In step (1) the colouring agent may be a pigment dispersed in the impregnating composition or may be a dye dissolved in the impregnating composition.

In step (1) the particles may be impregnated with the impregnating composition by immersion in the impregnating composition, or by mixing with the impregnating composition, or by spraying the impregnating composition onto the particles.

In step (2), the extending liquid may be recovered for reuse.

In step (3), suitable conditions to polymerise or cross-link may be elevated temperature, irradiation, and exposure to ultra violet light, or a combination of two or more thereof, optionally also with elevated pressure.

In step (4), the particles of step (3) may be coated with the binder composition by mixing or the like.

The first and second thermosetting resins may be the same or may be different.

The coating composition may also include a colouring agent, or may be colourless.

In step (5) the particles of step (4) may be, for example:
placed in a mould, or
placed on a substrate to which the particles are to be adhered, or
placed on a plate of a suitable press.

In step (6) the most usual conditions used are elevated temperature and pressure.

After step (6), the composite product may be post-treated by buffing, sanding, cutting or machining or the like, or by application of a suitable coating thereto.

According to a second aspect of the invention there is provided a composite product comprising:

(a) particles of an exfoliated vermiculite impregnated with a first thermosetting resin and a colouring agent for the particles, the first thermosetting resin having been polymerised or cross-linked; and (b) a binder comprising a second thermosetting resin, the second thermosetting resin having been polymerised or cross-linked to bind the particles together to form the composite product.

DESCRIPTION OF EMBODIMENTS

In the first step of the method of the invention, particles of an exfoliated vermiculite are impregnated with an impregnating composition comprising a first thermosetting resin, an extending liquid for the first thermosetting resin, if necessary a catalyst for the first thermosetting resin, and a colouring agent for the particles.

Vermiculite used in the method of the invention is a geological name given to a group of hydrated lamina industrial minerals which are aluminium iron magnesium silicates resembling mica in appearance. Vermiculite has the unusual attribute that when subjected to temperatures of the order of 750° C., vermiculite exfoliates or expands in volume as a result of the moving apart of the laminae due to the inter-laminae generation of steam, which is due to the release of crystalline water of hydration at these elevated temperatures.

Vermiculite is inert, is chemically pure, non carcinogenic, does not contain asbestos, lends itself admirably to through impregnation by the impregnating composition described, has the unusual attribute of being able to be dyed at very low dye concentrations, or to being pigmented, and is subsequently compressible during press forming operations from a bulk density of from 50 to 150 g per liter up to a final density of from 600 g to 1.6 kg per liter. Vermiculite is non corrosive, non combustible, non allergenic, is odourless and harmless, is proof to attack by micro organisms, and does not swell when water wetted.

After forming according to the method of the invention, the product containing vermiculite may be cut, drilled or worked with ease.

Vermiculite has a thermal conductivity of from 0.6 to 0.068 W/M° C. It has a specific gravity of 2.6, a melting point of 1315° C. and a sintering temperature of 1260° C.

For vermiculite, mass increase after impregnation and before recovery of the extending liquid is from 50 to 200% of the starting weight.

After impregnation and after removal of the extending liquid, the vermiculite particles contain from 5% to 60%, preferably from 10% to 40% inclusive by weight of the resin to 100% by weight of the vermiculite (i.e 5 to 60 g, preferably 10 to 40 g of resin to 10 g of vermiculite), which is in the range of 6 g to 60 g of resin per liter volume of vermiculite.

Typical screen analysis of the particle sizes suitable for the method of the invention are the large grade in which 90 to 98% of the mass is retained on a 2800 micron screen, to medium grade of screen analysis of 50 to 70% retained on a 1000 micron screen, 20 to 35% retained on a 710 micron screen, through different size grades down to the micron grade in which 90% passes a 500 micron screen.

As stated above, the first thermosetting resin and the second thermosetting resin may be the same or may be different. Examples of suitable thermosetting resins are set out below.

The thermosetting resin may for example be a phenol formaldehyde resole resin or a melamine formaldehyde resin or a melamine urea formaldehyde resin blend in which case the extending liquid may be water, or a C1 to C4 alcohol or a mixture thereof, but is preferably methyl alcohol, with or without acetone to propagate evaporative rate, and with or without water, and the catalyst may be a suitable acidic catalyst for phenolic resins or melamine resins.

The thermosetting resin may also be a polyester resin or an epoxy resin with a suitable catalyst or hardener respectively, in which case the extending liquid may be a halogenated hydrocarbon, preferably dichloromethane, or other non aqueous solvent, preferably super critical carbon dioxide.

The thermosetting resin may also be an acrylic, or a methacrylic acid ester resin, in a reactive methacrylate monomer, or dichloromethane, or preferably, a combination thereof.

The thermosetting resin may also be a urethane resin such as any containing reactive NCO groups, in which case the extending liquid may be dichloromethane or carbon dioxide.

However on the grounds of both cost and performance the preferred thermosetting resins are phenol formaldehyde resoles, unsaturated polyester resins, melamine formaldehyde resins, or melamine urea formaldehyde blends, or isocyanate resins, also referred to as MDIs or TDIs, or epoxy resins.

In the impregnating composition, the first thermosetting resin may be present in an amount of from 5 percent to 80 percent, preferably 20 to 50 percent by weight of the impregnating composition, the remainder being made up by the extending liquid and the catalyst, and other additives, if necessary.

More details of suitable thermosetting resins are set out below.

The thermosetting resin may be a phenol formaldehyde resole resin in liquid form which can be polymerised at ambient or elevated temperature. Examples include Cellobond J2027 L, J2018 L, J20/1096 L and J20/1081 L from BP Chemicals, UK, which may be catalysed with catalysts such as Phencat 10, Phencat 15 or VCM 90. A suitable melamine urea formaldehyde resin blend is Beckamine 1184 by PRP Resins, South Africa and catalysed with Hardener 2884 containing sulphuric acid.

Suitable extending liquids for use with the condensation resins are the C1 to C4 alcohols or water. The preferred extending liquid is methyl alcohol, with a boiling point of 64° C. Other non aqueous solvents may be used as a blend in order to improve evaporative rate, such as acetone.

The preferred thermosetting resins are the unsaturated isophthalic or orthophthalic liquid polyester resins. Typical examples are those manufactured by Scot Bader of England, such a Crystic 272 or Crystic 196 or those manufactured under the Atlac brand by DSM. Typical further polyester resins are those by NCS of South Africa such as Polylite 33410, 8130, or 8000, or particularly the NPG (neo-pentyl glycol) based resins such as the NPG gel coats and Code 7163 Natural by NCS of South Africa. Suitable catalysts are the conventional methyl ethyl ketone peroxides, or cyclohexanone peroxides or acetyl acetone peroxides, or preferably in order to facilitate processing, the more latent catalysts triggered by elevated temperatures such as Trigonox 29B-50 by Akzo Chemie, benzoyl peroxide formulations, and Interox TBPEH, which is t-butyl per-2-ethyl hexanoate. Bisplenol vinyl esters are also suitable.

Suitable extending liquids for the polyester resins include the halogenated hydrocarbons, the preferred one being dichloromethane, which has a boiling temperature of 39° C. and has a very high evaporative rate, and conforms in all respects to the requirements of the extending liquids.

Other types of suitable thermosetting resins are the acrylics, or methacrylic acid esters and methyl methacrylates in methacrylate monomer, which are typically catalysed with benzoyl peroxide powders.

The impregnating composition of the invention also includes an extending liquid. Examples of suitable extending liquids are mentioned above.

The extending liquid has the purpose of controlling viscosity, controlling the resin solids percentage added to the exfoliated vermiculite and promoting latency of the impregnating composition by reducing or removing reactivity until it is removed from the system, thereby preventing the "seeding" or viscosity increase of the composition as a result of premature resin polymerisation. The extending liquid should preferably have a sufficiently high evaporative rate or low boiling point to allow its economic and easy removal from the impregnated vermiculite and must be a suitable solvent for the dye where present and must lend itself to easy recovery where appropriate after its removal.

The purpose of the impregnating composition is to impose upon the exfoliated vermiculite suitable mechanical properties, to impose resistance to water wetting, to minimise subsequent resin absorption into the particle, to resinate at the level which still allows the particle to be compressed during forming, to seal in the dye or pigment so that subsequent resination does not become discoloured, and to ensure that the particles do not disintegrate during subsequent resin coating.

The impregnating composition may also include other components such as hydrophobic agents, accelerators, and fire retardants.

In addition, the impregnating composition may include a reactive solvent when the thermosetting resin is a polyester resin, in order to reduce the viscosity. Examples are styrene monomers which cross-link with the basic polyester resin and become part of the composite product.

Suitable pigments for use in the impregnating composition include titanium dioxide, and those commonly used in inks and paints which are dispersed into the resin before catalysis using typically a high speed disperser.

Suitable dyes for use in the impregnating composition are the Savinyls by Sandoz in the case of polyester systems, or Basantols by BASF for phenolic or melamine systems, added at levels of from 0.005% to 0.8% of the total impregnating composition on a weight basis.

In step (2) of the method of the invention, the extending liquid is removed and is preferably recovered for reuse.

In step (3) of the method of the invention, the impregnated particles are subjected to suitable conditions, e.g elevated temperature, irradiation, exposure to ultra-violet light, or elevated pressure, or combinations thereof, to polymerise or cross-link the first thermosetting resin.

Thus, after removal of the extending liquid a specific percentage of resin has been added to the particles of the exfoliated vermiculite and this resin is then polymerised or cross-linked preferably by heat, and there results pre-coloured and resinated particles of exfoliated vermiculite with low bulk densities of between 70 and 300 g per liter Prior to step (4) the particles of exfoliated vermiculite may be blended with other particles, being either other particles of exfoliated vermiculite with a different colour or size or the like, or some other suitable particles such as mica, which may form part of the ultimate composite product.

In step (4) of the method of the invention, the particles of step (3) are coated, i.e partially or completely covered, with a coating or binding composition comprising a second thermosetting resin and if necessary a catalyst for the second thermosetting resin.

The second thermosetting resin may be any of those named above. The coating preferably takes place in a gentle mixer such as a cascade mixer with a tumbling action.

The second thermosetting resin is added to the treated exfoliated vermiculite particles at a level of from 5 % to 80% by weight, preferably at a level of from 12% to 50% by weight when the product is to be press formed, or from 80% to 300% by weight where the product is to be cast in a mould.

Again 5% by weight means 5 g of resin to 100 g of treated particles.

In step (5), the particles of step (4) are formed into a desired shape. For example, the particles may be laid up in a suitable mould or may be laid up on a flat plate where a slab or sheet is to be produced, or may be laid onto a suitable substrate such as a lignocellulosic composite, eg chip board or medium density fibre board, or cementitous board, or paper, where a laminated product is required.

Thixotropic agents, such as Aerosil 200 by Degussa, may be added to the resin, when the resin is added at high proportions to the particles, so as to prevent seepage or phase separation, at levels of from 0.2 to 0.75% by weight.

In step (6) of the method of the invention, the particles are subjected to suitable conditions of temperature and pressure to polymerise or cross-link the second thermosetting resin to bind the particles together to form the composite product.

Examples of composite products that may be produced by the method of the invention are wash hand basins and baths, roof tiles, exterior claddings, kitchen work surfaces, table tops, wall or floor tiles and the like.

Items such as wash hand basins and baths may be formed in suitable moulds, while exterior claddings, wall or floor tiles, and kitchen work surfaces may be made in suitable presses. Table tops may be made in suitable presses by applying a layer of the particles to a suitable substrate to which the particles are then adhered. The edges of the table top may be made from a laminate of a pressed or cast composite in order to give a curved or bull nosed edge after machining.

After step (6), the composite product may-be post-treated as described above eg, by buffing, sanding, cutting or machining or by applying a coating thereto. The coating may be designed to emphasise the colour of the composite, or impose upon the composite product a desired abrasion resistance, hardness or the like.

Special effects may be achieved by, for example, including unimpregnated reflective micas in the composite product, or by using combinations of colouring agents such as pearlescent or reflective or day glo pigments, with conventional pigments, either on their own or in combination with dyes.

The unique contribution of exfoliated vermiculite is that the resin retained on impregnating the particles is infinitely variable, and may be at a much lower level than could possibly be achieved by immersing the vermiculite in the unmodified or undiluted resin. After the impregnation and the removal of the extending liquid and the polymerisation of the thermosetting resin preferably with heat, the now hardened resinated particles of exfoliated vermiculite have a very low bulk density, have improved mechanical properties, are suitably dyed or pigmented, have an infinitely reduced capacity to absorb liquids, thereby promoting ease of resin coating before pressing, and may be stored indefinitely for use in the method of the invention.

After casting or particularly after press forming of the composition of the invention, the resinated vermiculite contributes to the decorative resinous composite the properties of nailability, sandability, machinability, good modulus, good thermal properties, reduced shrinkage, excellent dimensional stability and sufficient flexural strength. In addition there is no tackiness that may be the result of interference of polymerisation, no floatation or phase separation occurs, warping is minimised, and the product has a reduced bulk density which property is controllable as a function of press pressure and thermosetting resin content. In addition catalyst level may be reduced as a result of hot pressing. With the use of vermiculite, there is reduced sanding dust, reduced resin usage, improved thermal shock and much reduced costs, not only as a function of reduced resin percentages but also as a result of the fact that the decorative composite may be laminated onto other substrates or pressed into thin flat sheets for use as tiles or for laminating or into moulded shaped articles such as wash hand basins.

An example of a decorative resinous composite laminated exterior building cladding board, comprising 9 mm bituminous lignocellulosic composite board made by the method disclosed in U.S. Pat. No. 5,209,886, onto which has been hot pressed a 1.7 mm thickness of resinated vermiculite particles prepared according to the method of this invention, will now be given.

1 Into 10 kg of methylene chloride is dissolved 10 kg of unsaturated isophthalic polyester resin Neopentyl Glycol water resistant specification Code 7163 by NCS Resins South Africa, accelerated with 0.1% cobalt octoate accelerator Code AC1.

2 Into the impregnating composition described (Step 1 above) is added 8 g of Savinyl Brown 2GLS dye by Hoechst, which dissolves in the composition.

3 Into the composition is stirred 150 g of Triganox 29B-50 latent catalyst by Akzo Chemie.

4 Exfoliated vermiculite (17 kg) Grade SFX by Micronised Products South Africa, with a screen analysis of 50 to 75% retained on a 1000 micron screen, 20 to 35% retained on a 710 micron screen, and 0 to 10% retained on a 355 micron screen is impregnated with the impregnating composition by immersion.

5 The excess impregnating composition is allowed to drain, preferably with vacuum assistance.

6 The extending liquid, ie the dichloromethane, is removed and is recaptured for reuse by condensation, and the final emitted air polished through suitable membranes.

7 The impregnated exfoliated vermiculite is heated to 105° C. for one hour in order to fully polymerise the unsaturated polyester resin.

8 The hardened resinated exfoliated vermiculite particles which have been dyed, have a bulk density of 120 g per liter, having risen from 90 g per liter.

9 The exfoliated vermiculite is placed in a gentle mixer and to every 3.5 kg of resinated vermiculite is added 700 g of polyester resin Code 7163 catalysed with Trigonox 29B-50 at the rate of 1.25%

10 The exfoliated vermiculite is cascaded in the mixer for one minute, during which time every particle has distributed over it a thin coating of liquid unsaturated pre-catalysed polyester resin. The mixture has a just damp consistency, capable of being poured or sprayed and which may easily be dispersed to uniform thickness.

11 The vermiculite is spread onto a bituminous board measuring 2.4 m×1.2 m, at a uniform thickness. 4.9 kg of particles are spread across the surface, which will give a final pressed thickness of 1.7 mm at a density of 1.

12 The board is now placed between the caul plates of a hydraulic press and is pressed at a pressure of 20 kg/cm$^2$ and a temperature of 90° C. for 3 minutes.

13 The board is removed from the press, and the edges are trimmed.

The surface of the board has a granite look, the surface of which is resin rich and is highly weather resistant.

Another example is the manufacture of a simulated granite wash hand basin. In this case, the resinated exfoliated vermiculite is coated with a polyester resin containing 0.3% of a dispersed thixotropic agent applied to the vermiculite at the rate of 150 parts by weight of resin to 300 parts by weight of pre-resinated exfoliated vermiculite, which has been suitably dyed. The composition is applied to the surface of a mould using a mechanical "flicker" action "Terylene" or air assisted type gun, or Putzmeister type gravity fed aggregate spray gun until a uniform thickness to the surface of the mould has been built up. The thixotropic resinous coating to the vermiculite prevents resin slump. When the appropriate thickness and uniformity has been built up in the mould, the female element of the mould is inserted and the component is pressed for ten minutes at a temperature of 100° C., to produce the wash hand basin.

The decorative resinous composite also lends itself to the production of thin sheets of 1 to 2.5 mm thickness, pressed on to a transfer paper, for lamination to other substrates.

What is claimed is:

1. A method of making a composite product includes the steps of:
   (1) impregnating particles of an exfoliated vermiculite with an impregnating composition comprising a first thermosetting resin, an extending liquid for the first thermosetting resin, if necessary a catalyst for the first thermosetting resin, and a colouring agent for the particles;
   (2) removing the extending liquid;
   (3) subjecting the impregnated particles to suitable conditions to polymerise or cross-link the first thermosetting resin;
   (4) coating the particles of step (3) with a binder composition comprising a second thermosetting resin and if necessary a catalyst for the second thermosetting resin;
   (5) forming the particles of step (4) into a desired shape; and
   (6) subjecting the particles of step (5) to suitable conditions to polymerise or cross-link the second thermosetting resin to bind the particles together to form the composite product, wherein:
   in step (1), the vermiculite particles are impregnated with from 5% to 60% by weight of the first thermosetting resin to 100% by weight of vermiculite, and
   in step (4), the treated exfoliated vermiculite particles are coated with from 5% to 300% by weight of the second thermosetting resin to 100% by weight of the treated vermiculite particles.

2. A method according to claim 1 wherein the colouring agent is selected from the group consisting of a pigment dispersed in the impregnating composition, and a dye dissolved in the impregnating composition.

3. A method according to claim 1 wherein in step (1) the particles are impregnated with the impregnating composition by immersion in the impregnating composition, by mixing with the impregnating composition, or by spraying the impregnating composition onto the particles.

4. A method according to claim 1 wherein in step (2) the extending liquid is recovered for reuse.

5. A method according to claim 1 wherein in step (3) the impregnated particles are subjected to any one or more of elevated temperature, irradiation, exposure to ultra violet light, and elevated pressure.

6. A method according to claim 1 wherein in step (4) the particles of step (3) are coated with the binder composition by mixing.

7. A method according to claim 1 wherein the first thermosetting resin and the second thermosetting resin are the same.

8. A method according to claim 1 wherein in steps (5) and (6) the particles of step (4) are placed in a mould and subjected to suitable conditions to polymerise or cross-link the second thermosetting resin to bind the particles together to form the composite product in ile mould.

9. A method according to claim 1 wherein in steps (5) and (6) the particles of step (4) are placed on a substrate to which the particles are to be adhered and then subjected to suitable conditions of elevated temperature and pressure to polymerise or cross-link the second thermosetting resin to adhere the particles to the substrate and to bind the particles together to form the composite product.

10. A method according to claim 1 wherein in steps (5) and (6) the particles of step (4) are placed on a plate of a suitable press and then subjected to suitable conditions of elevated temperature and pressure to polymerise or cross-link the second thermosetting resin to bind the particles together to form the composite product.

11. A method according to claim 1 wherein the particles of exfoliated vermiculite are impregnated with from 10% to 40% by weight of the first thermosetting resin and then the treated particles are coated with from 12% to 300% by weight of the second thermosetting resin.

12. A composite product comprising:
   a) particles of an exfoliated vermiculite impregnated with from 5% to 60 by weight of a first thermosetting resin to 100% by weight of vermiculite, and with a colouring agent for the particles, the resin having been polymerized or cross-linked, and
   b) a binder comprising a second thermosetting resin, the treated particles being coated with from 5% to 300% by weight of the second thermosetting resin to 100% by weight of the treated particles, the second thermosetting resin having been polymerized or cross-linked to bind the particles together to form the composite product, said composite product being made by a method according to claim 1, wherein said product comprises coloured particles and said binder is not coloured by said colouring agent for the particles.

13. A composite product made by a method according to any one of claims 1 to 11.

14. A composite product according to claim 12 wherein the first thermosetting resin and the second thermosetting resin are selected from a group consisting of phenol formaldehyde resole resins, unsaturated polyester resins, melamine formaldehyde resins, melamine urea formaldehyde resins, acrylic or methacrylic resins, isocyanate resins and epoxy resins.

15. A composite product according to claim 12 wherein the colouring agent is selected from a group consisting of a pigment and a dye.

16. A method of making a composite product includes the steps of:

(1) impregnating particles of an exfoliated vermiculite with an impregnating composition comprising a first thermosetting resin, an extending liquid for the first thermosetting resin, if necessary, a catalyst for the first thermosetting resin, and a colouring agent for the particles;

(2) removing the extending liquid;

(3) subjecting the impregnated particles to suitable conditions to thermoset or cross-link the first thermosetting resin;

(4) coating the particles of step (3) with a binder composition comprising a second thermosetting resin and, if necessary, a catalyst for the second thermosetting resin;

(5) forming the particles of step (4) into a desired shape; and (6) subjecting the particles of step (5) to suitable conditions to thermoset or cross-link the second thermosetting resin to bind the particles together to form the composite product;

wherein:

in step (1), the vermiculite particles are impregnated with from 5% to 60% by weight of the first thermosetting resin to 100% by weight of vermiculite; and in step (4), the treated exfoliated vermiculite particles are coated with from 5% to 300% by weight of the second thermosetting resin to 100% by weight of the treated vermiculite particles.

* * * * *